United States Patent [19]
Millas

[11] Patent Number: 5,694,685
[45] Date of Patent: Dec. 9, 1997

[54] METHOD AND APPARATUS FOR TREATING HEADER PLUG GASKET FACE

[75] Inventor: George Steve Millas, Houston, Tex.

[73] Assignee: Hudson Products Corporation, Houston, Tex.

[21] Appl. No.: 746,586

[22] Filed: Nov. 12, 1996

Related U.S. Application Data

[63] Continuation of Ser. No. 348,398, Dec. 2, 1994, abandoned.

[51] Int. Cl.$^6$ ..................................... B23P 15/26
[52] U.S. Cl. .............. 29/890.031; 29/38 A; 29/26 R; 29/402.02; 408/85
[58] Field of Search ............ 29/890.031, 402.02, 29/26 R, 27 R, 28, 38 A, 35.5, 559, 281.5, 281.6, DIG. 19; 82/101, 130; 408/20, 85, 103

[56] References Cited

U.S. PATENT DOCUMENTS

| | | |
|---|---|---|
| 1,905,651 | 4/1933 | Raule .................. 29/38 A |
| 2,032,127 | 2/1936 | Holmes ................ 29/38 A |
| 2,779,039 | 1/1957 | Borner ................ 29/56.6 X |
| 3,555,656 | 1/1971 | Brown et al. ....... 29/890.031 X |
| 4,283,615 | 8/1981 | Vrillon .............. 29/402.16 X |
| 4,644,635 | 2/1987 | Murai et al. ........ 29/35.5 X |
| 4,750,525 | 6/1988 | Vaughan ............. 29/517 X |
| 5,149,490 | 9/1992 | Brown et al. ....... 29/890.031 X |

Primary Examiner—Peter Vo
Assistant Examiner—Khan Nguyen
Attorney, Agent, or Firm—Robert J. Edwards; Michael L. Hoelter

[57] ABSTRACT

An apparatus and method for roughening or otherwise changing the gasket face of a bolt-like header plug. This apparatus utilizes a cutting or etching tool that cuts into the originally flat gasket face. A threaded shank formed by a lathe or other screw cutting machine extends from the face and is not useable for modifying the face. Roughening or otherwise modifying of the gasket face is in the form of grooves cut into the face so as to increase the sealing effect of the header plug when in use.

9 Claims, 2 Drawing Sheets

METHOD AND APPARATUS FOR TREATING HEADER PLUG GASKET FACE

This is a continuation of application Ser. No. 08/348,498 filed Dec. 2, 1994, now abandoned.

FIELD AND BACKGROUND OF THE INVENTION

The present invention relates, in general, to air cooled heat exchanger (ACHE) header plugs, and in particular, to a new and useful apparatus for treating the underneath side of the bolt head of a header plug for greater sealing capability.

Bolts for header plugs, and particularly bolts which act as header plugs for ACHE headers, are generally made by rotating a blank on screw cutting machinery and then cutting threads therein. These threads can extend either up to the bolt head or they can be terminated earlier anywhere along the bolt. Because of the manner of such construction, the underface of the bolt head is generally flat and smooth since the screw cutting machinery is incapable of making or cutting any feature in this underface surface due to the direction in which the screw cutting machinery is cutting the blank. It would be useful, however, to roughen or otherwise modify this normally smooth undersurface of the bolt head so as to improve the engagement of the gasket material by the bolt head thereby improving the sealing effect of the plug. Should the bolt head not sufficiently engage the gasket material, leakage can occur from underneath the bolt head.

It is thus an object of the present invention to provide an apparatus and method for changing the finish of the undersurface or gasket face of the bolt head of a header plug in an economic yet effective manner by using simple equipment that is adapted for mass production. Another object of the present invention is to provide an apparatus for changing or altering the normally smooth gasket face of a bolt-like header plug having a bolt head and a threaded shank extending from the bolt head. A further object of the invention is to provide such an apparatus where the changing or altering assembly is either a cutting mechanism which preferably rotates to cut concentric grooves in the gasket face, or an etching mechanism for etching the gasket face so as to change its finish. A further object of the present invention is to provide a method for changing the gasket face which includes holding the head and then etching or cutting the gasket face.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
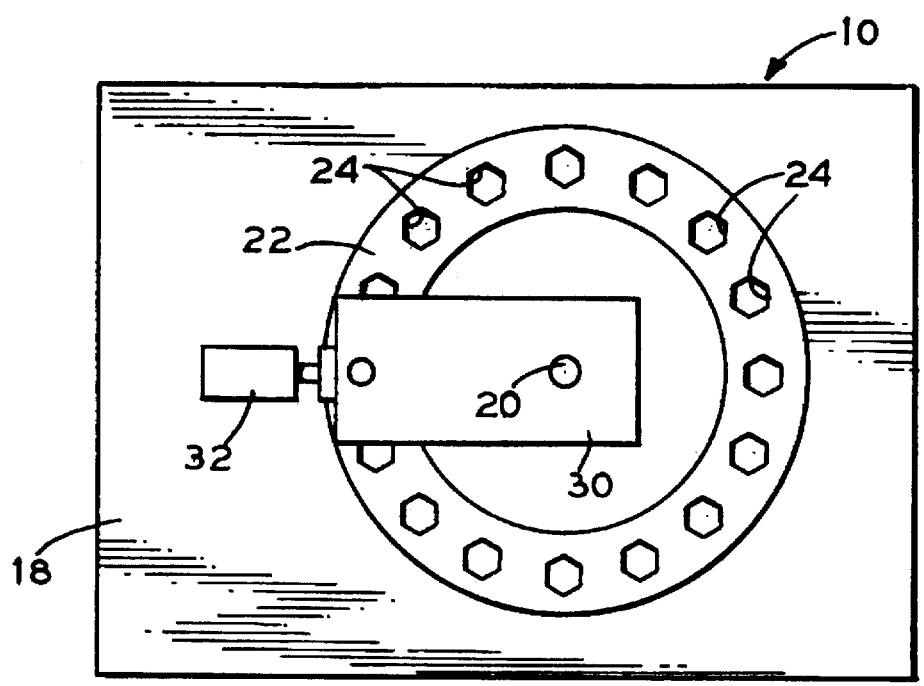
FIG. 1 is a schematic top plan view of the invention which roughens or otherwise alters the generally smooth gasket face of the bolt head of a header plug.
Figure 2:
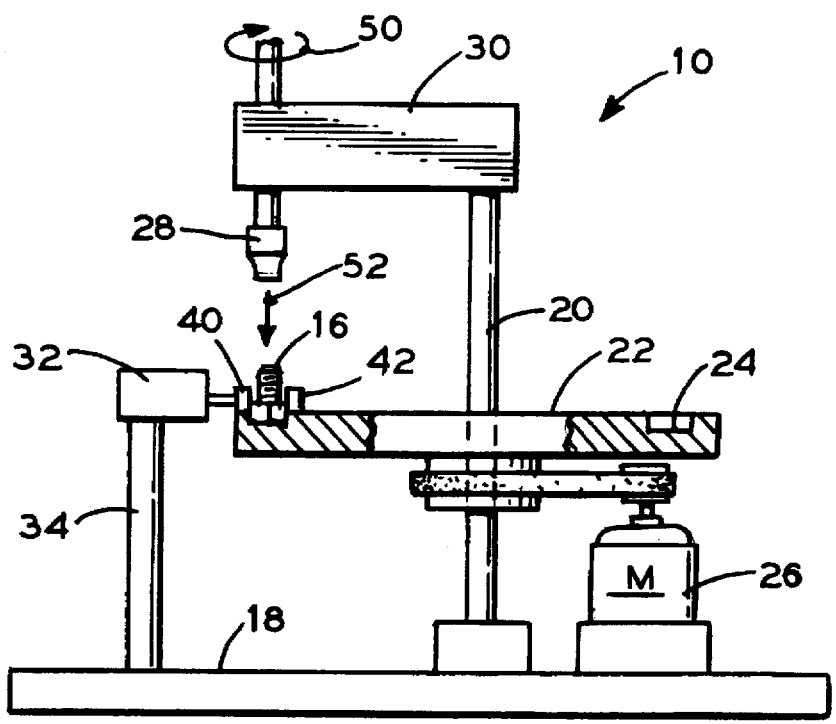
FIG. 2 is a side elevational view, partly in section, of the apparatus in FIG. 1.

Referring initially to FIGS. 1 and 2, there is shown cutting apparatus 10 for changing, altering, roughening or otherwise cutting the underneath side or gasket face 12 of bolt head 14 of header plug 16. This is done to increase the sealing capability of header plug 16 when used to seal ACHE headers.

As shown in these drawings, cutting apparatus 10 includes base 18 and an upright shaft or column 20 which also acts as a journal or central point of rotary feed table 22. A plurality of recesses 24 are circumferentially spaced around the upper surface of table 22. These recesses 24 will generally be shaped in accordance with the shape of bolt head 14 so as to restrain and hold bolt head 14 therein. Ideally, recesses 24 will be shaped so as to prevent header plug 16 from rotating while positioned within its respective recess 24. Thus, recesses 24 will generally be shaped as a hexagon or an octagon, but any other shape can be accomplished as well.

Table 22 can be indexed in a rotary fashion if desired by any suitable means, such as by a motor or motor with gear reduction 26 acting as part of indexing means. This causes table 22 to be either automatically or manually indexed to sequentially bring each recess 24, under or within the vicinity of rotary cutting head 28.

Cutting head 28 is designed to be moved axially downwardly toward the header plug 16 contained within recess 24. This cutting head 28 is also rotated by member 30 which may, for example, be a drill press. For convenience, drill press 30 can be mounted on the top of shaft 20 although any other mechanism for positioning cutting head 28 above an appropriate circumferential location of table 22 is possible. Alternately, table 22 can be held in a fixed position while drill press 30 is indexed from station to station around table 22 or even in a linear path in the case where recesses 24 are distributed in some pattern other than an annular pattern.

Figure 3:
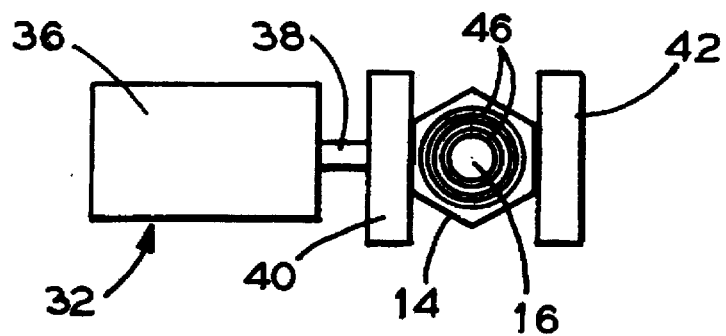
FIG. 3 is a top plan view of a clamping mechanism used in the present invention.

As better illustrated in FIG. 3, a holding mechanism such as an air powered clamp 32 is positioned in the vicinity of the recess 24 positioned underneath cutting head 28. This clamp 32 is designed to engage and clamp a portion of bolt head 14 of header plug 16 so as to further prevent header plug 16 from moving or rotating during the cutting operation. Clamp 32 is generally supported in this position atop support 34 secured to base 18.

Figure 4:
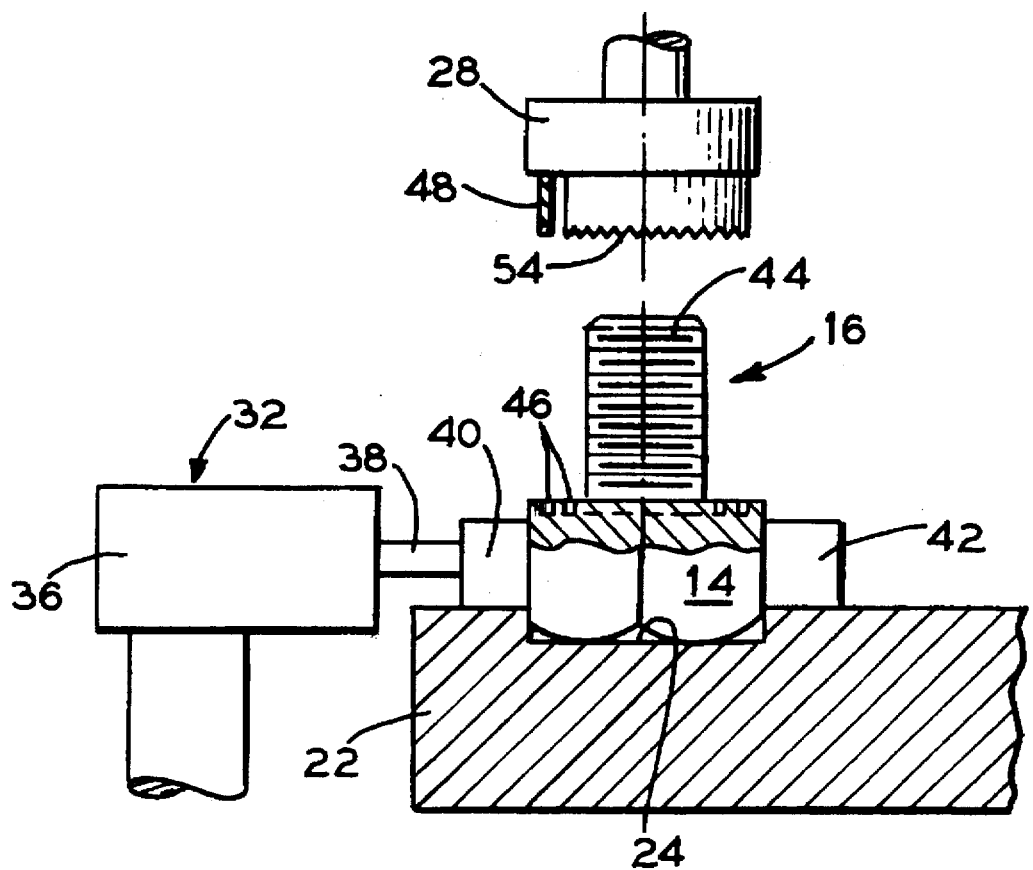
FIG. 4 is an exploded view showing the changing mechanism in the form of a groove cutter which modifies the header plug to be modified according to the present invention.

FIGS. 3 and 4 illustrate clamp 32 as including air cylinder 36 secured to shaft 38 which, in turn, is connected to movable jaws 40. Alternatively, shaft 38 can be secured to only one movable jaw 40 while opposite jaw 42 remains fixed in place. These jaws 40, regardless of whether being movable or not, clamp bolt head 14 of header plug 16 therebetween. As shown in FIG. 4, the depth of recess 24 is sized so that a portion of bolt head 14 will extend upward above recess 24. It is this portion of bolt head 14 extending above recess 24 that is engaged by jaws 40 and/or 42.

Header plug 16 includes threaded shank 44 which is generally manufactured in a conventional manner using a lathe or other appropriate screw cutting machinery (not shown). Threaded shank 44 extends upwardly from underneath side or gasket face 12 of bolt head 14. In any conventional lathe or screw cutting machine, this underneath side 12 is featureless and flat and generally extends radially outward from shank 44. The lathe or screw cutting machine has no mechanism for cutting any detailed feature into this gasket face 12.

According to the present invention, gasket face 12 of bolt head 14 is to be roughened, cut, or otherwise modified so as to increase the sealing effect of the header plug 16. A preferred pattern for this modification is to apply, etch, or cut a plurality of (generally at least two) concentric grooves 46 into gasket face 12 of bolt head 14. This is accomplished by affixing cutting tool 48 to drill press 30 and subsequently rotating such tool 48 (and hence cutting head 28) as shown by arrow 50. Cutting tool 48 is then moved axially as shown by arrow 52 to bring it's cutting surface 54 into engagement with gasket face 12 of now restrained bolt head 14. This operation of drill press 30 may be manual or it may be automated upon the placement of header plug 16 within clamp 32, which may also be either manually or automatically controlled.

Cutting tool 48 is, by necessity, tubular and/or hollow with an open area between its cutting surfaces 54. This open area is so that tool 48 can be maneuvered down around and alongside threaded shank 44 of plug 16 without engaging such threaded shank 44. In other words, tool 48 is designed so that threaded shank 44 can extend up within tool 48 without contacting tool 48. In this fashion, tool 48 is able to cut, etch, or otherwise roughen up the now exposed gasket face 12 of bolt head 14. Of course, in order to accomplish this, there will be little clearance between tool 48 and threaded shank 44. Additionally, tool 48 may incorporate a guide or sleeve for the insertion of shank 44 therein during the cutting operation.

It is preferable for tool 48 to contain multiple (and preferably concentric) cutting surfaces 54 so that a plurality of notches or grooves 46 (preferably concentric) can be etched or cut at the same time. Alternatively, a first groove 46 can be cut by one tool 48 and then a differently sized groove 46 can be subsequently cut by a differently sized tool 48. Of course, this method will necessitate the removal of the first tool 48 from drill press 30 and its substitution with the second tool 48. In any event, one, two, or more grooves 46 can be marked or cut in gasket face 12 of bolt head 14 as needed.

Such grooves 46, while shown here as being concentric, may also be non-concentric and may be of any shape (i.e. circular or non-circular) so long as gasket face 12 of bolt head 14 is no longer smooth and flat. An uneven surface of side 12 is desired so as to prevent pressure loss from occurring across bolt head 14.

As stated above, during operation, clamp 32 firmly holds that portion of bolt head 14 which extends above recess 24. The size of recess 24 is selected so as to positively locate each header plug 16 around table 22. Recess 24 is also sized to allow a portion of bolt head 14 to be exposed so that it can be clamped during the cutting operation. Recesses 24 may be 1", 1¼", 1½", 2" or any other size in order to closely receive and preferably restrain bolt head 14 therein.

Alternately, cutting head 28 can be replaced by an etching or other face modifying device which can be vibrated, rotated, moved linearly or in any other appropriate direction for modifying gasket face 12.

While a specific embodiment of the invention has been shown and described in detail to illustrate the application of the principles of the invention, it will be understood that the invention may be embodied otherwise without departing from such principles.

What is claimed is:

1. A method of scratching or grooving a gasket face of a bolt head of a header plug, a threaded shank extending from the gasket face, the gasket face extending outwardly from the threaded shank, the method comprising the steps of:

providing a table having a plurality of spaced apart, upwardly open recesses, each shaped to closely receive a bolt head of a header plug, with the gasket face of the header plug exposed upwardly;

dropping the bolt head of a header plug into each one of at least some of the recesses;

clamping each bolt head at a clamping location adjacent around the table in its respective recess;

rotating the table by an indexing means to bring said each bolt head and its respective recess to the clamping location; and engaging changing means into the gasket face of the bolt head in the clamping location while the bolt head is clamped for scratching or grooving the gasket face.

2. The method according to claim 1 further comprising in the step of changing the gasket face by cutting at least one groove in the gasket face while the bolt head is clamped.

3. An apparatus for scratching or grooving a gasket face of a bolt head of a header plug, a threaded shank extending from the gasket face, the gasket face extending outwardly from the threaded shank, the apparatus comprising:

a table having a plurality of spaced apart, upwardly open recesses, each shaped to closely receive a bolt head of a header plug, with the gasket face of the header plug exposed upwardly;

clamping means is provided at a clamping location and is located adjacent said table for clamping each bolt head in its respective recess when the table is rotated to bring the bolt head to the clamping location;

indexing means for rotating the table to bring each one of the recesses having the bolt head positioned therein one after the other, into the clamping location; and changing means movable into engagement with the gasket face of the bolt head in the clamping location while the bolt head is clamped by said clamping means for scratching or grooving the gasket face.

4. The apparatus according to claim 3 wherein said changing means comprises a cutter for cutting at least one groove in the gasket face.

5. The apparatus according to claim 4 wherein said changing means comprise a drill press.

6. The apparatus according to claim 5 wherein said clamping means comprise at least one movable jaw for engagement with a portion of the bolt head extending from one of said recesses.

7. The apparatus according to claim 6 wherein the operation of said clamp is automatic.

8. The apparatus according to claim 6 wherein the operation of said drill press is automatic.

9. The apparatus according to claim 6 wherein the changing means comprises means for cutting the gasket face.

* * * * *